US005855092A

United States Patent [19]
Raap et al.

[11] Patent Number: 5,855,092
[45] Date of Patent: Jan. 5, 1999

[54] SASH BRAKE FOR DOUBLE-HUNG WINDOW WITH PIVOTING SASH

[75] Inventors: Daniel L. Raap, New Sharon; Scot C. Miller, Pella, both of Iowa

[73] Assignee: Pella Corporation, Pella, Iowa

[21] Appl. No.: 865,216

[22] Filed: May 29, 1997

[51] Int. Cl.[6] ..................... G05D 15/22

[52] U.S. Cl. ..................... 49/181; 49/416; 49/428

[58] Field of Search ..................... 49/181, 176, 414, 49/415, 416, 428, 429, 430, 431, 432, 433, 445

[56] References Cited

U.S. PATENT DOCUMENTS

| | | |
|---|---|---|
| 1,928,543 | 9/1933 | Reynolds . |
| 3,012,292 | 12/1961 | Brengman . |
| 3,055,063 | 9/1962 | Peters . |
| 3,184,784 | 5/1965 | Peters . |
| 3,462,882 | 8/1969 | Brown, Jr. . |
| 3,842,540 | 10/1974 | Anderson . |
| 3,844,066 | 10/1974 | Nobes . |
| 3,979,791 | 9/1976 | Collin . |
| 4,271,631 | 6/1981 | Trout . |
| 4,324,072 | 4/1982 | Sterner, Jr. . |
| 4,452,012 | 6/1984 | Deal . |
| 4,493,128 | 1/1985 | Corry . |
| 4,551,881 | 11/1985 | Hoffman . |
| 4,570,382 | 2/1986 | Suess ..................... 49/431 X |
| 4,590,708 | 5/1986 | Campodonico . |
| 4,644,691 | 2/1987 | Wright . |
| 4,718,194 | 1/1988 | FitzGibbon et al. . |
| 4,763,447 | 8/1988 | Haltof et al. . |
| 4,887,389 | 12/1989 | Haltof . |
| 4,914,861 | 4/1990 | May . |
| 4,922,657 | 5/1990 | Foss . |
| 4,926,524 | 5/1990 | Owens . |
| 5,027,557 | 7/1991 | May . |
| 5,069,001 | 12/1991 | Makarowski . |
| 5,077,939 | 1/1992 | Erickson . |
| 5,099,963 | 3/1992 | Alchin . |
| 5,210,976 | 5/1993 | Cripps . |
| 5,251,401 | 10/1993 | Prete et al. . |
| 5,371,971 | 12/1994 | Prete . |
| 5,377,384 | 1/1995 | Riegelman . |
| 5,383,303 | 1/1995 | Nakanishi et al. . |
| 5,414,960 | 5/1995 | O'Donnell et al. . |
| 5,452,495 | 9/1995 | Briggs . |
| 5,566,507 | 10/1996 | Schmidt et al. . |

*Primary Examiner*—Jerry Redman
*Attorney, Agent, or Firm*—Hovey, Williams, Timmons & Collins

[57] ABSTRACT

A double hung window having a tiltable sash includes a sash brake for preventing movement of the sash along the jambs while in the tilted position. The preferred sash includes respective tongues extending along the stiles that are configured for reception in corresponding channels in the jambs for slidably mounting the sash and providing a seal between the stiles and window frame. The preferred brake elements each include a base configured for fitting within a groove of a respective tongue and a brake shoe that extends into the channel. Each shoe has a length greater than the width of channel so that when the sash is tilted, the shoe engages the channel side walls to provide braking against movement while in the tilted position.

15 Claims, 2 Drawing Sheets

SASH BRAKE FOR DOUBLE-HUNG WINDOW WITH PIVOTING SASH

BACKGROUND OF THE INVENTION

1. Field of the Invention

The present invention relates to the field of fenestration products including windows. In particular, the invention is concerned with a tiltable window sash and a brake for preventing slidable movement of the sash while in the tilted position.

2. Description of the Prior Art

Double hung windows with tiltable sashes provide an advantage in that the sashes can be tilted inwardly for convenient cleaning, repair or replacement. These types of windows include a balancing assembly such as springs or the like that balance the weight of the sash. In the tilted position, the top rail of the sash is supported and less weight is presented to the balancing mechanism. As a result, the balancing mechanism causes the bottom rail, which is still engaged between the jambs, to slide up the jambs.

The prior art discloses a variety of brake mechanisms for preventing movement of the sash while in the tilted position. These prior art mechanisms tend to be mechanically complex resulting in additional manufacturing expense and the potential for mechanical failure.

In one prior art device, ellipse-shaped cam elements extend from the stiles into respective jamb channels at the ends of nail-like fasteners with the interior end driven into the wood of the stile. When the window is tilted, the long axis ends of the cam elements engage the side walls of the channels to brake the movement of the sash. The cam element has a tendency to damage the side walls of the channel and only engages after the window is tilted about 30°. This allows sliding of the window until this position is reached. Also, the fastener tends to loosen over time allowing the cam element to rotate with a resulting loss in braking effectiveness.

SUMMARY OF THE INVENTION

The present invention solves the prior art problem discussed above and provides a distinct advance in the state of the art. More particularly, the preferred sash brake hereof is mechanically simple, engages upon minimal tilting of the sash, does not damage the channel side walls, and remains secure for the life of the window.

The preferred window includes a frame presenting opposed jambs with each having a channel, and a sash with opposed stiles presenting tongues along the lengths thereof extending into the channels for slidably mounting the sash in the window opening and for providing a weather seal between the stiles and frame. The sash includes a pair of brake elements. Each element includes a base configured to fit in a groove defined in a respective tongue and including a base extension extending along a portion of the groove to prevent rotation of the brake element relative to the stile. The preferred brake element also includes a brake shoe extending into a respective channel and presenting a generally rectangular configuration with rounded corners. The length of the shoe is greater than the width of the channel and opposed diagonal corners engage the channel side walls and thereby brake the sash upon minimal tilting of the sash. Other preferred aspects of the present invention are disclosed herein.

DETAILED DESCRIPTION OF THE PREFERRED EMBODIMENT

Figure 1:
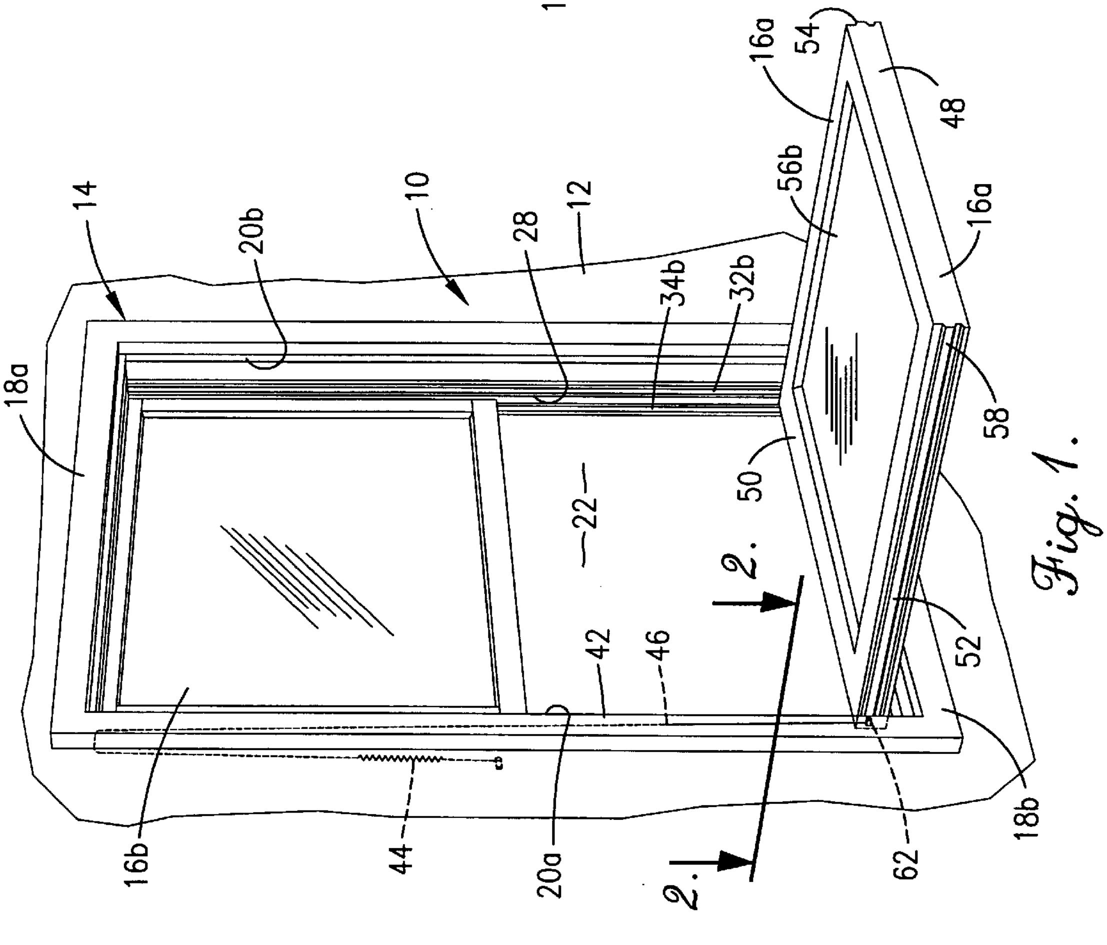
FIG. 1 is a pictorial view of the preferred window shown mounted in a wall with the lower sash in the tilted position.

The drawing figures illustrate preferred window 10. Referring to FIG. 1, window 10 is shown mounted in wall 12 and includes frame 14, lower sash 16*a* and upper sash 16*b*.

Figure 2:
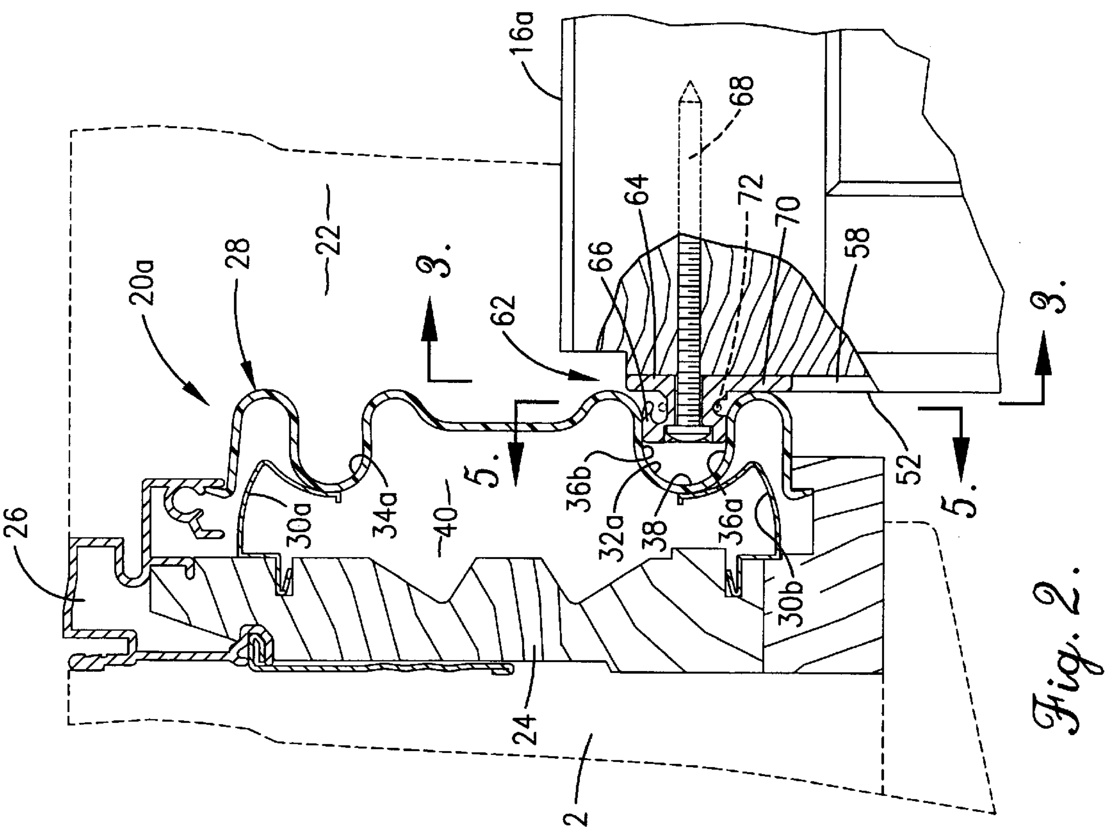
FIG. 2 is a partial sectional view taken along line 2—2 of FIG. 1.

Frame 14 includes top and bottom frame members 18*a* and 18*b* and left and right jambs 20*a* and 20*b* cooperatively defining window opening 22. FIG. 2 is a partial cross sectional view illustrating jamb 20*a* with jamb 20*b* being the same except left-right reversed. Jamb 20*a* includes wood, jamb frame member 24, frame cladding with aluminum mounting hardware 26, jamb liner 28 and jamb springs 30*a* and 30*b*.

Jamb liner 28 is preferably composed of polyvinyl chloride (PVC), substantially spans the width of jamb frame 24, and is configured to present inner sash channels 32*a* and 32*b* and outer sash channel 34*a* and 34*b* spaced and parallel to channel 32. Each channel 32*a,b* and 34*a,b* is defined by spaced side walls 36*a* and 36*b* and bottom wall 38 and gradually narrows toward bottom wall 38. Liner 28 is spaced from jamb frame member 24 with jamb opening 40 defined therebetween. Liner 28 is resilient and flexes inwardly toward jamb frame member 24 during tilting of sash 16*a*. Jamb springs 30*a,b* are positioned in jamb opening 40 between liner 28 and frame member 24 and are configured to bias liner 28 away from frame member 24 in order to maintain sealing engagement with sash 16*a* as described further herein.

Window 10 also includes conventional balancing mechanism 42 having a pair of balancing springs 44 and balance cords 46 for each sash 16*a,b* (shown only for the left side of lower sash 16*a* in FIG. 1). Balancing spring 44 is received in jamb opening 40 with one end secured to jamb frame member 24. The other end of spring 44 is coupled with one end of balance cord 46 which extends upwardly through opening 40 and then down through a respective channel such as inner channel 32*a* where the other end is coupled with one of the stiles of sash 16*a* as described further herein. A pair of springs 44 are configured to balance the weight of the connected sash for easy slidable movement in window opening 22.

Sash 16*a* includes top rail 48, bottom rail 50, left stile 52 and right stile 54 connected as illustrated to support panes 56*a* and 56*b*. As best viewed in FIG. 4, each stile 52, 54 includes an outwardly extending tongue 58 configured for extending into a respective channel 32*a,b* for slidably mounting sash 16*a* to frame 14 in window opening 22 in the operating position illustrated in FIGS. 4 and 6. Each tongue 58 is also configured for sealing engagement with a respective side wall 36*a,b* of the corresponding channel 32*a,b*. In this way, tongues 58 provide a seal between stiles 52, 54 and frame 14 while still allowing slidable movement of sash 16*a*. Tongues 58 each include groove 60 defined therein. Upper sash 16*b* is configured the same as lower sash 16*a* but positioned to slide in outer channels 34*a,b* when in the operating position.

Figure 3:
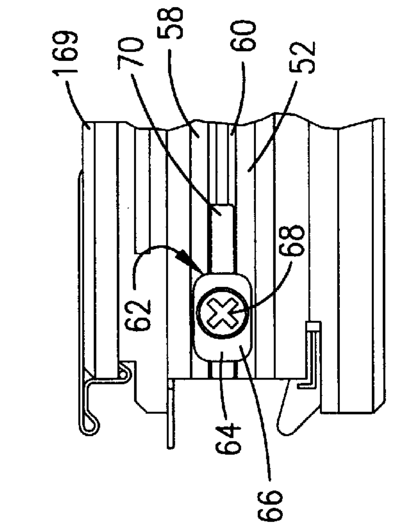
FIG. 3 is a partial sectional view taken along line 3—3 of FIG. 2.

Each sash 16*a,b* further includes a pair of brake elements 62 extending outwardly from respective stiles near the bottom edges thereof. Each brake element 62 includes base 64, brake shoe 66 and fastener 68. In the preferred embodiment, base 64 and shoe 66 are integrally formed of glass reinforced polyurethane. As best viewed in FIGS. 2, 3 and 4, base 64 is configured to fit in groove 60 and further includes base extension 70 that extends outwardly along groove 60. Extension 70 provides additional leverage against rotation of brake element 62 relative to fastener 68 and relative to stiles 52, 54.

Figure 5:
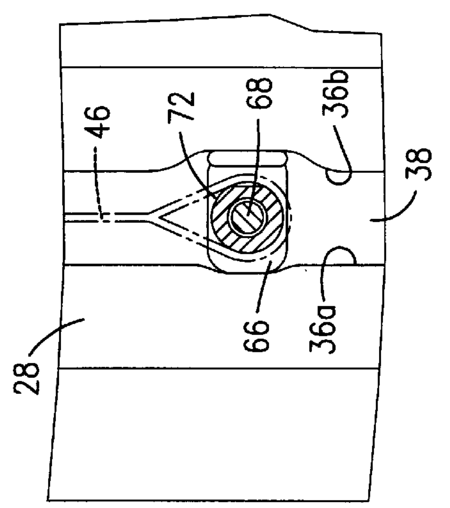
FIG. 5 is a partial sectional view taken along line 5—5 of FIG. 2.
Figure 6:
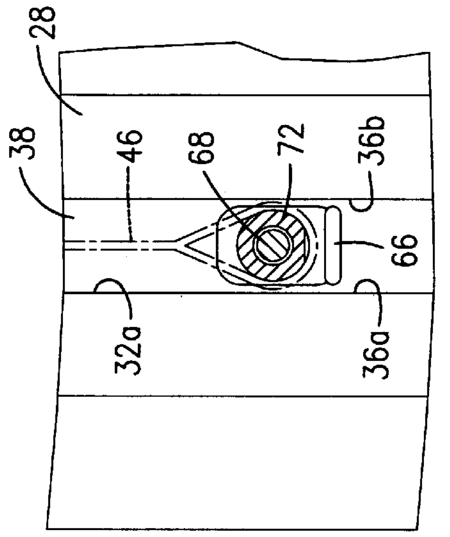
FIG. 6 is a partial sectional view taken along a line 6—6 of FIG. 4.

Referring to FIGS. 5 and 6, brake shoe 66 presents a generally rectangular configuration with rounded corners. As illustrated in FIG. 6, the width of shoe 66 is less than the width of a respective channel 32*a,b*. As best shown in FIG. 5, the length of shoe 66 is greater than the width of respective channels 32*a,b*. In the fully tilted positions shown in FIG. 5, brake shoe 66 is wedged between channel side walls 36*a,b* to provide braking action against the bias of balancing mechanism 42. The resilient nature of side walls 36*a,b* and the polyurethane composition of shoe 66 prevents damage to either component even after repeated engagement during the life of window 10.

Fastener 68 is preferably a wood screw that extends through the center of brake element 62 and into a respective tongue 58 of stile 52, 54 and into rail 50. As discussed above, the configuration of base 64 including base extension 70 prevents rotational movement of brake element 62 relative to fastener 68 and stiles 52, 54, thereby preventing loosening of fastener 68.

Brake element 62 also includes neck portion 72 positioned between base 64 and brake shoe 66 and integral therewith. A loop in the distal end of each balance cord 46 is received about neck 72 of each brake element as illustrated in FIGS. 2–6. With this configuration, each balance cord 46 is positioned in a respective channel 32*a,b* and 34*a,b*.

Figure 4:
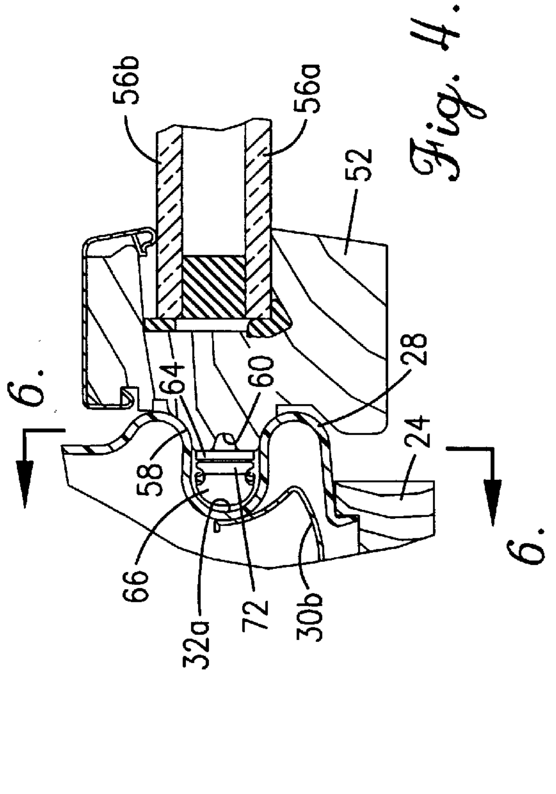
FIG. 4 is a partial sectional view similar to FIG. 2 but with the sash in the operating position.

FIGS. 4 and 6 illustrate sash 16*a* in the operating position. In this position, tongues 58 and brake element 62 are received in respective channels 32*a,b* allowing up and down slidable movement of sash 16*a*. In order to move sash 16*a* to the tilted position illustrated in FIGS. 1–3 and 5, top rail 48 is grasped and pulled inwardly. This causes jamb liners 28 to shift inwardly against the bias of jamb springs 30*a,b* because of the sloped configuration of channel side walls 36*a,b*. As a result, the tongues 58 of stiles 52, 54 slip out of channels 32*a,b* allowing sash 16*a* to pivot about brake elements 62.

When the tilt angle of stiles 52, 54 relative to jambs 20*a,b* reaches about 13°, diagonally opposite corners of brake shoes 66 are in contact with respective side walls 36*a,b* of channels 32*a,b*. The compositions of brake shoes 66 and jamb liners 28 provide sufficient friction at this tilt angle to brake movement of sash 16*a* against the bias of balancing mechanism 42. As the tilt angle increases, the braking action increases to a maximum at the fully tilted position with a tilt angle of 90° as illustrated in FIGS. 1–3 and 5.

As those skilled in the art will now appreciate, the preferred window of the present invention provides a significant advance in the state of the art and will also appreciate that the present invention encompasses many variations in the preferred embodiment described herein.

Having thus described the preferred embodiment of the present invention, the following is claimed as new and desired to be secured by Letters Patent:

1. A window comprising:

a frame defining a window opening and presenting jambs on opposed sides of said opening, said jambs having walls including opposed side walls defining respective channels; and a window sash including opposed stiles having respective tongues extending outwardly therefrom and extending substantially along the entire lengths thereof, each tongue being configured for extending into a respective one of said channels for slidably mounting said sash in said opening and having structure for engaging said opposed side walls of said channels sufficiently to provide a seal between said stiles and frame, said sash presenting weight, said window further including balance means for balancing the weight of said sash including a pair of balance cords positioned adjacent and coupled with respective stiles, said tongues each including structure defining a groove therealong, said window further including a pair of brake elements extending outwardly from said tongues respectively and into said respective channels, said window being shiftable between an operating position in which said tongues are received in said respective channels and a tilted position in which said window is tilted about said brake elements with said stiles at an angle relative to said channels, each of said brake elements being operable for braking said sash against movement due to said balance means when in said tilted position and including:

a base coupled with a respective tongue and configured for fitting into a respective groove and including a base extension extending along a portion of the length of said groove for preventing rotation of said brake element relative to said stile, and a brake show presenting a long axis generally parallel to said grooves, presenting a width of the respective channel, and presenting a length at least as great as the width of a respective channel.

2. The window as set forth in claim 1, each of said brake elements including a single fastener extending therethrough into a respective one of said tongues for coupling therewith.

3. The window as set forth in claim 2, said fastener including a screw.

4. The window as set forth in claim 1, said brake elements being composed of glass reinforced polyurethane.

5. A window comprising:

a frame defining a window opening and presenting jambs on opposed sides of said opening, said jambs having walls including opposed side walls defining respective channels; and a window sash including opposed stiles having respective tongues extending outwardly therefrom and extending substantially along the entire lengths thereof, each tongue being configured for extending into a respective one of said channels for slidably mounting said sash in said opening and having structure for engaging said opposed side walls of said channels sufficiently to provide a seal between said stiles and frame, said window further including a pair of brake elements extending outwardly from said respective stiles and into said respective channels, said window being shiftable between an operating position in which said tongues are received in said respective channels and a tilted position in which said window is tilted about said brake elements with said stiles at an angle relative to said channels, each of said brake elements including a brake shoe extending into a respective one of said channels and presenting a generally rectangular configuration with rounded corners and configured so that, as said window shifts from said operating position toward said tilted position, diagonally opposed ones of said corners engage the side walls of a respective one of said channels when said angle is less than 90 degrees.

6. The window as set forth in claim 5, said angle being less than 30°.

7. The window as set forth in claim 6, said angle being about 13°.

8. The window as set forth in claim 5, said tongues each including structure defining a groove therealong, each of said brake elements including a base coupled with a respective one of said tongues and configured for fitting into a respective groove and including a base extension extending along a portion of the length thereof for preventing rotation of said brake element relative to said stile.

9. The window as set forth in claim 8, each of said brake elements including a single fastener extending therethrough into a respective one of said tongues for coupling therewith.

10. The window as set forth in claim 9, said fastener including a screw.

11. The window as set forth in claim 5, said sash presenting weight, said window including balance means for balancing the weight of said sash, said balance means including a pair of balanced cords positioned adjacent respective stiles and coupled with respective brake elements.

12. A window comprising:

a frame defining a window opening and presenting jambs on opposed sides of said opening, said jambs having walls including opposed side walls defining respective channels;

a window sash including opposed stiles having respective tongues extending outwardly therefrom and along the lengths thereof, said sash presenting weight each tongue including structure defining a groove therealong and being configured for extending into a respective channel for slidably mounting said sash in said opening and having structure for engaging said opposed side walls of said channels sufficiently to provide a seal between said stiles and frame;

balance means for balancing the weight of said sash including a pair of balance cords positioned adjacent and coupled with respective stiles; and a pair of brake elements extending outwardly from said tongues respectively and into said respective channels, said window being shiftable between an operating position in which said tongues are received in said respective channels and a tilted position in which said window is tilted about said brake elements with said stiles at an angle relative to said channels, each of said brake elements including a base configured for fitting into a respective groove, a brake shoe extending into a respective one of said channels and presenting a generally rectangular configuration with rounded corners and configured so that, as said window shifts from said operating position toward said tiled position, diagonally opposed ones of said corners engage the side walls of a respective one of said channels when said angle is less than 30° in order to brake said sash against movement due to said balance means, and for each of said brake elements, only one fastener extending therethrough into a respective one of said tongues through a respective one of said grooves for coupling said brake element to a respective one of said stiles, said base including a base extension extending along a portion of the length of said respective groove for preventing rotation of said brake element relative to said fastener.

13. The window as set forth in claim 12, for each of said brake elements, said base and brake shoe being integrally formed of glass reinforced polyurethane.

14. The window as set forth in claim 12, said jambs each including a resilient jamb liner.

15. The window as set forth in claim 12, said balance cords being coupled with respective brake elements.

* * * * *